United States Patent [19]
Diehl et al.
[11] 3,944,470
[45] Mar. 16, 1976

[54] STABILIZATION AND ENHANCEMENT OF ENZYMATIC ACTIVITY

[75] Inventors: Francis Louvaine Diehl, Wyoming; Eugene Zeffren, Montgomery; Edward John Milbrada, West Chester, all of Ohio

[73] Assignee: The Procter & Gamble Company, Cincinnati, Ohio

[22] Filed: June 29, 1973

[21] Appl. No.: 375,251

[52] U.S. Cl. .................... 195/63; 195/68
[51] Int. Cl.[2] .................... C07G 7/02
[58] Field of Search .................... 195/63, 68

[56] References Cited

UNITED STATES PATENTS 3,702,804 11/1972 Barker et al. .................... 195/63
3,773,674 11/1973 Adam et al. .................... 195/68 X

*Primary Examiner*—Lionel M. Shapiro
*Attorney, Agent, or Firm*—Charles R. Wilson; Thomas H. O'Flaherty; Richard C. Witte

[57] ABSTRACT

Enzyme-containing compositions having improved stability and enzymatic activity in aqueous medium, comprising an enzyme and certain aminated polysaccharides, such as aminated cellulose and aminated starch. Enzymatic detergent compositions comprising certain organic surface-active agents in combination with enzymes and aminated polysaccharides are disclosed as well.

6 Claims, No Drawings

STABILIZATION AND ENHANCEMENT OF ENZYMATIC ACTIVITY

BACKGROUND OF THE INVENTION

The stabilization of enzymatic activity is a standing problem in all areas of technology where enzymes are likely to be applied. Stability in this sense stands for resistance to decrease in enzymatic activity prior to usage, e.g., under storage conditions. Concurrently, the enhancement of enzymatic activity has as well received careful attention. Stability and activity problems of compositions containing enzyme components are thought to find their origin in the rather complicated enzyme structure itself. In any event problems become most important when the enzyme-containing composition or additive is formulated with water or is used in aqueous solutions.

Prior art reference representative of the efforts spent to cope with the problems described above include the following. From an article by M. Ceska, EXPERIENTIA, No. 27, 7 pages 767–68, it is known that the activity of certain enzymes may be enhanced through the presence of certain water-soluble nonionic polymers such as dextrans and polyethyleneglycols. Said enhancement is apparently limited to enzymes which catalyze reactions involving high molecular weight substrates or substrates which are known to form multiple attachments with enzymes. Weetal, BIOCHIMICA ET BIOPHYSICA ACTA, 212 (1970) pages 1–7, describes the possibility of increasing the storage stability of water-insoluble enzymes by covalently attaching these enzymes to organic and inorganic carriers. Examples of suitable organic carriers include polyaminopolystyrene, cellulose and polyamino acids. Lilly, et al., THE CHEMICAL ENGINEER, January-February 1968, pages 12–18, refers to enhanced stability characteristics of enzymes by attaching said enzymes to water-insoluble polymers such as cellulose derivatives.

U.S. Pat. No. 3,639,213, Ginger, et al., teaches that streptokinase with increased stability can be obtained by covalently bonding said enzyme to a carbohydrate support. Suitable carbohydrates include cellulose, dextran, starch, dextrins and other polysaccharides having a well-defined molecular weight. U.S. Pat. No. 3,539,450, Deutsch, relates to the stabilization of enzymes by means of certain polyhydric compounds, preferably mannitol, sorbitol, lactose or polyvinyl alcohol.

It is a main object of this invention to provide enzyme containing compositions having improved stability and activity when employed in aqueous media.

It is another object of this invention to provide a method for more beneficially employing enzymes in solution by co-dissolving said enzymes in an essentially aqueous medium together with aminated polysaccharide.

It is still another object of this invention to provide detergent compositions with stabilized and enhanced proteolytic, lipolytic, and amylolytic activity.

It is a further object of this invention to provide detergent compositions capable of exerting enhanced enzymatic activity comprising organic surface-active agents, enzymes and aminated polysaccharide.

The above and other objects are now attained by codissolving in an essentially aqueous medium an enzymatic ingredient in combination with well-defined aminated polysaccharides. Additional objects are met by formulating detergent compositions comprising enzymes, surface-active agents, and well-defined aminated polysaccharides.

SUMMARY OF THE INVENTION

The above objectives are accomplished by an enzyme composition which demonstrates enhanced stability and activity when dissolved or dispersed in an aqueous medium, comprising:

a. an enzyme; and b. an aminated polysaccharide having from about 0.01 to about 2 percent by weight of nitrogen in its elemental composition; the weight ratio of said polymer to said enzyme being in the range from about 500:1 to 1:1.

In the detergent embodiment of this invention, compositions are contemplated comprising (1) from about 5 to about 99.9 percent by weight of an organic surface-active agent selected from the group consisting of anionic, nonionic, zwitterionic and ampholytic detergents and mixtures thereof; and (2) from about 50 to about 0.1 percent by weight of a mixture comprising (i) an enzyme suitable for use in detergent compositions; and (ii) an aminated polysaccharide having from about 0.01 to about 2 percent by weight of nitrogen in its elemental composition; the weight ratio of said enzyme to said aminated polysaccharide being in the range from about 1:500 to 1:1.

DETAILED DESCRIPTION OF THE INVENTION

Unless indicated to the contrary, the "%" indications used herein stand for "percent by weight."

In accordance with the present invention, an effective stabilization and enhancement of enzymatic activity in an essentially aqueous medium is obtained by co-dissolving enzymes with an aminated polysaccharide. In the context of the present invention, the terms "dissolving" and "co-dissolving" are meant to embrace dissolving and dispersing of the essential components in the essentially aqueous medium. The invention is not limited by the order of addition of the essential components, i.e., the aminated polysaccharide can be added to the enzyme-containing solution or the enzymatic ingredient can be added to the solution or dispersion of the aminated polysaccharide. Preferably mixtures of enzymatic ingredient and aminated polysaccharide are formulated with other desired ingredients and added concurrently.

The compositions of this invention can also contain minor amounts of additional ingredients such as; hydrotropes and solubilizers, i.e., lower alcohols such as methanol, ethanol, propanol, sodium toluene sulfonate and sodium xylene sulfonate; wetting agents; colors; perfumes; opacifying agents; and additional stabilizing agents.

Essentially all enzymes will be stabilized and/or activated in the practice of this invention when dissolved in an essentially aqueous medium in combination with the stabilizing component.

Enzymes are used for many purposes in various fields where biochemical reactions occur. In general, an enzyme can be described as a catalyst capable of exerting its activity in a biochemical reaction. They are classified according to the type of reaction they catalyze. Enzymes have complex chemical structures which basically consist of high molecular weight polymers of amino-acids of diffrent structure. All enzymes are proteins, although some contain a non-protein prosthetic group. That latter group can sometimes be represented by a pyrimidine ring or by a purine radical; enzymes involved in some oxidation-reduction reactions often contain such a prosthetic group. Enzymes are characterized by a high specificity, that is to say, there is a strict limitation of the action of each enzyme to one substance or to a very small number of closely related substances. Dual specificity has been shown with some enzymes in rare cases. On the other hand, a given reaction, e.g., an oxidation, may be brought about by a number of different enzymes, using different acceptors.

The chemical reaction catalyzed is the specific property which distinguishes one enzyme from another and it is logical to use it as the basis for the classification and naming of enzymes. In addition, the Enzyme Commission (EC) adopted a numbering system which is closely linked with the classification based upon specificity. As an example, all known enzymes can be arranged in six main classes; namely:

| Class | Examples |
|---|---|
| EC1 *Oxidoreductases* | Lactate oxidase, xanthine oxidase, fatty acid peroxydase. |
| EC2 *Transferases* | Glycine acyltransferase, maltose phosphorylase, fructokinase. |
| EC3 *Hydrolases* | Lipase, tannase, α-amylase, proline iminopeptidase. |
| EC4 *Lyases* | Cysteine synthase. |
| EC5 *Isomerases* | Lysine racemase, maleate isomerase. |
| EC6 *Ligases* | Asparagine synthetase. |

In general, all enzymes can be treated according to this invention, thereby acquiring improved stability and activity properties. It is understood, however, that for the purpose of carrying out this invention, the selection of a particular enzyme which is to be treated according to the instant method requires only routine knowledge, e.g., certain enzymes can be less desirable because of their incompatibility to light, water, oxygen and other conditions to which they are likely to be exposed.

Examples of enzyme species suitable for use in the instant invention include:

| EC | Trivial Name |
|---|---|
| 1.1.1.1 | Alcohol dehydrogenase |
| 1.1.1.6 | Glycerol dehydrogenase |
| 1.1.1.27 | Lactate dehydrogenase |
| 1.1.1.37 | Malate dehydrogenase |
| 1.1.3.4 | Glucose oxidase |
| 1.10.3.2 | Laccase |
| 1.10.3.3 | Ascorbate oxidase |
| 1.11.1.3 | Fatty acid peroxidase |
| 1.11.1.6 | Catalase |
| 1.11.1.7 | Peroxidase |
| 1.13.1.13 | Lipoxidase |
| 2.3.1.5 | Arylamine acetyltransferase |
| 2.3.1.6 | Choline acetyltransferase |
| 2.3.1.8 | Phosphate acetyltransferase |
| 2.3.1.13 | Glycine acyltransferase |
| 2.4.1.8 | Malto-phosphorylase |
| 2.6.1.12 | Alanine-ketoacid aminotransferase |
| 3.1.1.3 | Lipase |
| 3.1.1.13 | Cholesterol esterase |
| 3.1.1.20 | Tannase |
| 3.1.3.1 | Alkaline phosphatase |
| 3.1.3.2 | Acid phosphatase |
| 3.1.4.1 | Phosphodiesterase |
| 3.2.1.1 | α-amylase |
| 3.2.1.2 | β-amylase |
| 3.2.1.4 | Cellulase |
| 3.2.1.11 | Dextranase |
| 3.2.1.14 | Chitinase |
| 3.2.1.17 | Muramidase (lysozyme) |
| 3.4.1.2 | Aminopeptidase |
| 3.4.2.3 | Yeast carboxypeptidase |
| 3.4.4c | Bromelain |

-continued

| EC | Trivial Name |
|---|---|
| 3.4.4.1 | Pepsin |
| 3.4.4.3 | Rennin |
| 3.4.4.4 | Trypsin |
| 3.4.4.5 | Chymotrypsin |
| 3.4.4.10 | Papain |
| 3.4.4.16 | Subtilopeptidase A (alkaline proteases from Bac. Subtilis organisms) |
| 3.4.4.17 | Aspergillopeptidase A |
| 4.1.1.25 | Tyrosine decarboxylase |
| 4.1.1.26 | DOPA decarboxylase |
| 4.1.2.7 | Ketose-1-phosphate aldolase |
| 4.1.1.13 | Fructose-diphosphate aldolase |
| 4.2.1.1 | Carbonic anhydrase |
| 5.1.1.2 | Methionine racemase |
| 5.2.1.1 | Maleate isomerase |
| 5.3.1.1 | Triosephosphate isomerase |
| 5.3.1.9 | Glucosephosphate isomerase |
| 6.2.1.3 | Acyl-CoA synthetase |
| 6.3.2.1 | Pantothenate synthetase |
| 6.3.2.3 | Glutathione synthetase |
| 6.4.1.1 | Pyruvate carboxylase |
| 6.4.1.3 | Propionyl-CoA carboxylase |

Preferred for use in the method embodiment of this invention are enzymes of EC classes 1 and 3. Examples thereof are listed hereinabove. More preferred are peroxidases (EC 1.11.1.7) and subtilopeptidase A (EC 3.4.4.16).

The enzymes suitable for being incorporated in the detergent composition embodiment of the instant invention include all those which degrade or alter or facilitate the degradation or alteration of soil and stains encountered in cleansing situations so as to either remove more easily the soil or stain from the fabric or object being laundered or make the soil or strain more removable in a subsequent cleansing step. Both degradation and alteration improve soil removability. Well known and preferred examples of these enzymes are proteases, lipases and amylases. Lipases are classified as EC class 3, hydrolases, subclass EC 3.1, preferably carboxylic ester hydrolases EC 3.1.1. An example thereof are lipases EC 3.1.1.3 with the systematic name glycerol ester hydrolases. Amylases belong to the same general class as lipases, subclass subclass EC 3.2, especially EC 3.2.1 glycoside hydrolases such as 3.2.1.1 α-amylase with the systematic name α-1,4-glucan 4-glucano-hydrolase; and also 3.2.1.2, β-amylase with the systematic name α-1,4-glucan maltohydrolase. Proteases belong to the same class as lipases and amylases, subclass EC 3.4, particularly EC 3.4.4 peptide peptido hydrolases such as EC 3.4.4.16 with the systematic name subtilopeptidase A.

Obviously, the foregoing classes should not be construed as limitative with respect to the scope of this invention. They merely serve as examples which are known to find application in detergent technology. Enzymes serving different functions can also be used in the practice of this invention, the selection depending upon the intended purpose of a particular composition, either alone or in combination with the foregoing species.

Esterases and lipases hydrolyze uncharged substrate present in fat soils. The main factors influencing the specificity of the enzyme are the lengths and shapes of the hydrocarbon chain on either side of the ester link. The hydrolysis of triglyceride compounds through the catalytic action of lipases serves to prevent the formation of fatty acid mineral salts which are but difficultly removable from the fabrics to be laundered under conditions of temperatures and pH normally encountered in conventional laundry operations. Accordingly, the preferred lipases exhibit lipolitic activity under conditions of soaking and laundering as regards temperature and pH range. By way of example, soaking operations are performed within the range of from 40°F to 160°F whereas normal laundering operations can be carried out at temperatures up to the boil, i.e., about 212°F.

Lipases suitable for use herein include those of animal, plant, and microbiological origin. Although only a few studies on lipase distribution in plants have been conducted, suitable lipase enzymes are present in cambium, bark, and in plant roots. In addition, lipases have been found in the seeds of fruit, oil palm, lettuce, rice bran, barley and malt, wheat, oats and oat flour, cotton, tung kernels, corn, millet, coconuts, walnuts, fusarium, cannabis and cucurbito.

Suitable lipases are also found in many strains of bacteria and fungi. For example, lipases suitable for use herein can be derived from Pseudomonas, Aspergillus, Pneumococcus, Staphylococcus, and Staphylococcus Toxins, Mycobacterium Tuberculosis, *Mycotorula Lipolytica*, and Sclerotinia microorganisms.

Suitable animal lipases are found in the body fluids and organs of many species. Most organs of mammals contain lipases, but in addition, the enzymes are found in several digestive juices as well as in pancreatic juice. A preferred class of animal lipase herein is the pancreatic lipase.

Specific examples of the commercially-available lipase enzymes, suitable for use herein, the pH ranges of their optimum activity, and the source appear in Table I. Of course, it is preferred to use a given lipase with its range of optimum activity.

TABLE I

| *Lipase | pH Range of Lipolytic Activity | Source |
|---|---|---|
| Remyzyme PL-600 | 7–11 | Pancreatic Juice |
| Astra | 7–10 | Microbial |
| Nacase | 7–9 | Microbial |
| Lipase YL | 7–9 | Microbial |
| Wallerstein AW | 7–9 | Fungal |
| Amano M-AP | 6–8 | Fungal |
| Meito MY-30 | 6–8 | Fungal |
| Amano CE | 8–10 | Microbial |
| Amano CE-50 | 7–10 | Microbial |
| Amano AP-6 | 6–8 | Fungal |
| Takedo 1969-4-9 | 6–8 | Microbial |

*Designated by commercial source.

The lipases preferred for use herein are Amano CE, Amano M-AP, Takedo 1969-4-9, and Meito MY-30.

Lipases can be employed in the present detergent compositions in an amount from about 0.005 to about 2%, preferably from 0.01 to 0.5%, on a pure enzyme basis. While in washing liquor, the concentrations employed are dependent upon the particular enzyme used and the conditions of solution, such as pH, temperature, and period of the pre-soak, normally, concentrations in the range of from about 1 ppm to about 100 ppm and preferably from about 5 ppm to about 50 ppm, are employed. Pre-soak compositions having a lipase component within the range defined hereinbefore normally provides useful concentrations of lipase in solution.

The amylolytic enzymes which can be stabilized and enhanced in the detergent composition embodiment can be of fungal, plant, animal or bacterial origin. Suitable amylolytic enzymes include α- and β-amylases. By way of example, suitable α-amylases of mold origin including those derived from *Aspergillus oryzae*, *Aspergillus niger*, *Aspergillus alliaceus*, *Aspergillus wentii*, and *Pencillium glaucum*. The α-amylases derived from cereal grains, pancreatic sources and such bacteria as *Bacillus subtilis*, *Bacillus macerans*, *Bacillus mesentericus* and *Bacillus thermophilus* are also useful herein. These enzymes are active in the pH range of from about 4.5 to about 12 and, depending upon the species, at temperatures including laundering temperatures, i.e., 95°F up to the boil.

Preferred amylolytic enzymes herein are the α-amylases derived from the bacterial organism Bacillus subtilis. These amylases provide excellent desizing and starch digestive properties and are especially useful in the laundering of textile materials containing soils and stains of a starchy nature.

The amylolytic enzymes useful herein can be employed in a pure state. Generally, they are employed in the form of a powdered commercially available preparation wherein the amylolytic enzyme is present in an amount of from about 2 to about 80% of the preparation. The remaining portion, i.e., about 20 to about 98%, comprises inert vehicle such as sodium sulfate, calcium sulfate, sodium chloride, clay or the like. The active enzyme content of these commercial enzyme compositions is the result of manufacturing methods employed and is not critical herein so long as the finished compositions of this invention have the hereinafter specified enzyme content. Specific examples of commercial enzyme preparations suitable for use herein and the manufacturers thereof include: Diasmen α-amylase (Daiwa Kasei KK, Tokyo, Japan); Rapidase α-amylase THC-25 (Rapidase, Seclin, France); Novo Bacterial α-amylase (Novo Industri, Copenhagen, Denmark); Wallerstein α-amylase (Wallerstein Company, Staten Island, N.Y.); Rhozyme-33 and Rhozyme H-39 (Rohm & Haas, Philadelphia Pa).

Preferred herein is a powdered enzyme preparation containing α-amylase and a mixture of alkaline and neutral proteases available as CRD-Protease (or Monsanto DA-10) from Monsanto Company, St. Louis, Missouri.

The amylolytic enzymes can be employed in the detergent composition embodiment of this invention in an amount from about 0.005 to about 2%, preferably from 0.01 to 0.5% on a pure enzyme basis.

Suitable proteolytic enzymes for use in the detergent composition embodiment can be of vegetable, animal bacterial, mold and fungal origin.

The proteolytic enzyme can be employed in the compositions of the present invention in an amount of 0.005 to about 3%, on a pure enzyme basis. Best results in terms of overall cleaning efficacy and stain-removing properties are attained when the proteolytic enzyme is employed in an amount of about 0.01% to about 1% on a pure enzyme basis.

Specific examples of proteases suitable for use are trypsin, collagenase, keratinase, elastase, subtilisin, BPN and BPN'. Preferred proteases are serine proteases produced from microorganisms such as bacteria, fungi or mold. The serine proteases which are produced by mammalian systems, e.g., pancreatin, are also useful herein.

Specific examples of commercial enzyme products and the manufacturer thereof include: Alcalase, Novo Industri, Copenhagen, Denmark; Maxatase, Koninklijke Nederlandsche Gist-En Spiritusfabriek N.V., Delft, Netherlands; Protease B-4000 and Protease AP, Schweizerische Ferment A.G., Basel, Switzerland; CRD-Protease, Monsanto Company, St. Louis, Missouri; Viokase, VioBin Corporation, Monticello, Illinois; Pronase-P, Pronase-E, Pronase-AS and Pronase-AF all of which are manufactured by Kaken Chemical Company, Japan; Rapidase P-2000, Rapidase, Seclin, France; Takamine, HT proteolytic enzyme 200, Enzyme L-W (derived from fungi rather than bacteria), Miles Chemical Company, Elkhart, Ind.; Rhozyme P-11 concentrate, Rhozyme PF, Rhozyme J-25, Rohm & Haas, Philadelphia, Pa. (Rhozyme PF and J-25 have salt and corn starch vehicles and are proteases having diastase activity); Amprozyme 200, Jacques Wolf & Company, a subsidiary of Nopco Chemical Company, Newark, N.J.; Takeda Fungal Alkaline Protease, Takeda Chemical Industries, Ltd., Osaka, Japan; Wallerstein 201-HA, Wallerstein Company, Staten Islan, N.Y.; Protin AS-20, Dawai Kasei K.K., Osaka, Japan; and Protease TP (derived from thermophilic Streptomyces species strain 1689), Central Research Institute of Kikkoman Shoya, Noda Chiba, Japan. The aminated polysaccharides suitable for use in the instant invention have from about 0.02 to about 2% by weight of nitrogen in their elemental composition. The weight ratio of said polysaccharide to enzyme is in the range from about 500:1 to about 1:1, preferably from 100:1 to 2:1. The aminated polysaccharide is made from a polysaccharide and a nitrogen-containing agent. Polysaccharides are high molecular-weight carbohydrates. They may be viewed as condensation polymers of five or more monosaccharide residues. Low molecular weight natural polysaccharides, i.e., those containing from up to 100 residues are rare. Preferred stabilizing agents include aminated cellulose and aminated starch components. Cellulose is the polysaccharide that forms the main constituent of the cell wall of plants. It is made up of D-glucose units joined together as in cellobiose, i.e., of β-D-glucose units linked glycosidically from $C_{(1)}$ to $C_{(4)}$. Cellulose is of linear molecular structure. Cellulose from different sources has a different chain-length and the molecular weight can vary with the conditions prevailing when it was synthesized by the plant. In the average, it appears that cellulose containing from about 100 to about 3000 D-glucose units.

Starch is a food reserve materials of the plant and animal kingdom. It is a mixture of two main polysaccharide components, namely, a linear species called amylose and a highly branched species called amylopectin. In general, starches contain, depending upon their origin, up to 30% of amylose and up to 98% of amylopectin.

Amylose contains linear chains of 1 – 4′ α-D-glycopyranose having a degree of polymerization of about 1,000 to about 6,000. Amylopectin has a molecular weight in the range from $10^6$ to 10 million. It has a branched structure whereby the chains having 1 - 4 α-D-glycopyranose bonds are branched through 1 – 6′ linkages. For more details, see POLYSACCHARIDES, by Gerald O. Aspinall, Pergammon Press, New York, 1st Edition, 1970, incorporated herein by reference.

The operable aminated polysaccharides contain from about 0.01 to about 2% of nitrogen in their elemental composition, and are prepared by reacting a polysaccharide starting material with an aminating agent such as an amine, preferably a tertiary amine, or a quaternary ammonium compound. These N-containing substituents preferably impact a cationic charge to the aminated polysaccharide, when they are maintained at a pH which is equal to or below their pka. Examples of aminated polysaccharides suitable for use in the instant invention and methods for their preparation are described in U.S. Pat. Nos. 3,472,840, Stone, et al.; and 3,431,254, Klug; these disclosures being incorporated herein by reference. The aminated polysaccharide component can be made using condensation techniques known in the art. To facilitate the reaction between aminating agent and polysaccharide, the former preferably contains a reactive moiety as, for example, can be seen from what follows.

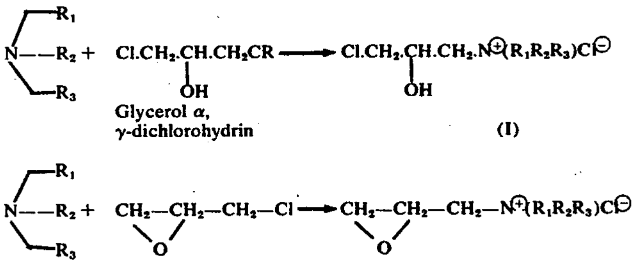

Glycerol α, γ-dichlorohydrin (I)

Epichlorohydrin (II)

$R_1$ represents hydrogen or an alkyl group having from 1 to 4 carbon atoms, $R_2$ represents hydrogen or an alkyl group having from 1 to 4 carbon atoms and $R_3$ represents hydrogen or an alkyl group having fram about 1 to about 12 carbon atoms. It is understood that in this definition of variables, the term "alkyl" encompasses both substituted and unsubstituted alkyls wherein the substituents, in addition to hydrocarbon moieties, can be any group that is stable to reaction conditions for derivatizing the polysaccharide starting material. Examples of such substituents include: amino alkyl, cyanoalkyl, hydroxyalkyl, acetyl and carboxyalkyl groups. Specific examples of operable aminating agents include trimethylamine; dimethylbutylamine; dimethylhexylamine; dimethyl dodecylamine; methyl-diethylamine; methylethylbutylamine; diethylamine; dipropylamine; dibutylamine; ethyldecylamine; methylnonylamine. Additional examples of aminating agents are: (4-chlorobutene-2)-trimethylammonium chloride; β-diethylaminoethylchloride hydrochloride; dimethylaminomethylmethacrylate and 2,3-epoxypropyltrimethylammonium chloride.

Additional examples of aminated polysaccharides for use in the instant invention are obtained from reacting polysaccharides with the aminoalkylating agents disclosed in U.S. Pat. No. 3,431,254, particularly the aminating agents used in the examples.

Examples of aminated polysaccharides which are commercially available are:

| Tradename | Supplier |
|---|---|
| Astro X-100 | Penick & Ford, Limited |
| Cato | National Starch and Chemical Corp. |
| Electra | Anheuser-Busch, Incorporated |
| Q-Tac | Corn Products Company |
| Sta-Lok | A. E. Staley Manufacturing Co. |
| Supercharg | Stein-Hall and Company, Inc. |

Aminating materials (I) and (II), can, e.g., be reacted with the polysaccharide material in a known matter.

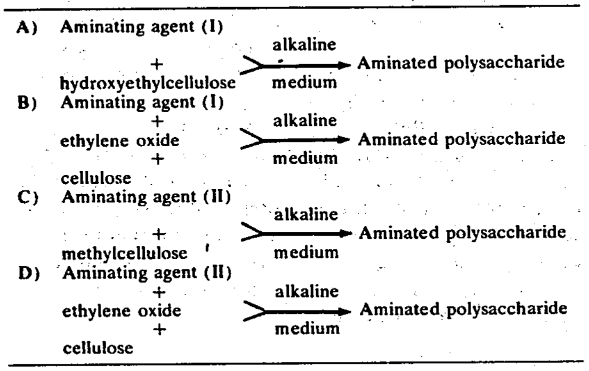

Identical aminations can be carried out by replacing cellulose with starch.

An aminated polysaccharide prepared according to reaction A) above can have the following structural formula:

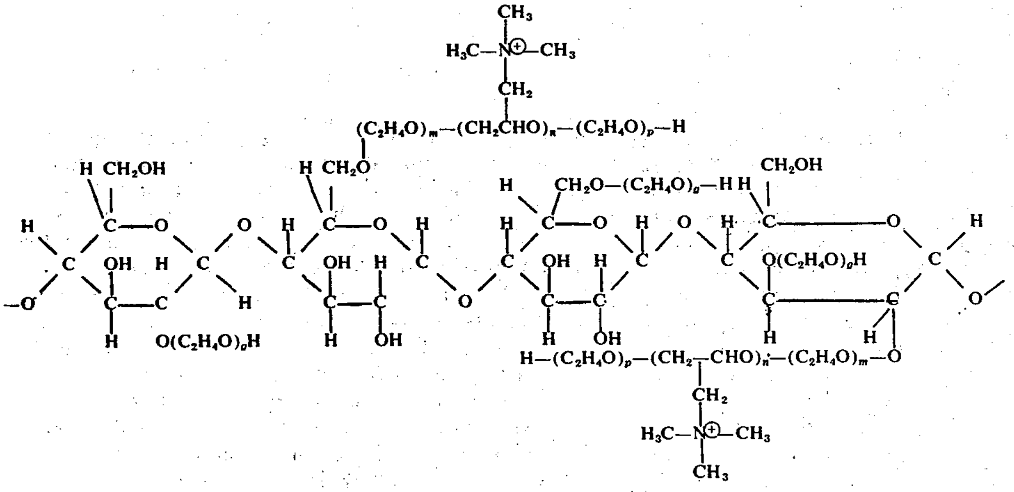

whereby expressed as averages per anhydroglucose unit: $n = 0.35$ to 0.45; $m + p + g = 1$ to 2.

Preparation of aminated polysaccharide according to reaction C above: 1.485 g epichlorohydrin was mixed with 0.945 trimethylamine in 20 ml water, stirred for 8 hours at room temperature, and stored at room temperature overnight. Volatile components were removed under reduced pressure. 30 g of methylcellulose and 0.225 g sodium hydroxide in 600 ml water were added; and the mixture stirred for 20 hours at 40°C. The reaction mixture was then stored at ambient conditions and a pH of about 7 for 48 hours. The aminated polysaccharide was recovered by freeze-drying. The yield was 29.2 g; i.e., more than 90%. Kjeldahl analysis showed 0.02% nitrogen (AP 1). Using the same procedure, but with 5.94 epichlorohydrin, 3.78 g trimethylamine and 0.9 g sodium hydroxide 39 g of product were obtained having a nitrogen content of 0.17% (AP 2).

The compositions contemplated in the detergent embodiment of this invention comprise: (1) from about 5 to about 99.9% of an organic surface-active agent selected from the group consisting of anionic, nonionic, zwitterionic and ampholytic detergents and mixtures thereof; and (2) from about 95 to about 0.1% of a mixture comprising (i) an enzyme suitable for being used in the detergent compositions; and (ii) an aminated polysaccharide having from about 0.2 to about 2% by weight of nitrogen and its elemental composition; the weight ratio of said enzyme to said polymer being in the range from about 1:500 to 1:1.

The detergent ingredient is preferably used in an amount from about 8 to about 99%. Examples of suitable organic detergents are anionic, nonionic, ampholytic and zwitterionic detergents and mixtures thereof, are described in U.S. Pat. No. 3,579,454 incorporated herein by reference, particularly Column 11, line 45 to Column 19, line 64.

Preferred for use herein are the alkali metal alkyl benzene sulfonates, in which the alkyl group contains from about 9 to about 20 carbon atoms in straight chain or branched-chain configuration, e.g., those of the type described in U.S. Pat. Nos. 2,220,099 and 2,477,383 (especially valuable are linear straight chain alkyl benzene sulfonates in which the average of the alkyl groups is about 11.8 carbon atoms and commonly abbreviated as $C_{11.8}$LAS).

Another preferred detergent for use herein includes alkyl ether sulfates. These materials have the formula $RO(C_2H_4O)_xSO_3M$ wherein R is alkyl or alkenyl of about 10 to about 20 carbon atoms, $x$ is 1 to 30, and M is a water-soluble cation such as alkali metal, ammonium and substituted ammonium. The alkyl ether sulfates useful in the present invention are condensation products of ethylene oxide and monohydric alcohols having about 10 to about 20 carbon atoms. Preferably, R has 14 to 18 carbon atoms. The alcohols can be derived from fats, e.g., coconut oil or tallow, or can be synthetic. Lauryl alcohol and straight chain alcohols derived from tallow are preferred herein. Such alcohols are reacted with 1 to 30, and especially 1 to 6, molar proportions of ethylene oxide and the resulting mixture of molecular species, having, for example, an average of 3 moles of ethylene oxide per mole of alcohol, is sulfated and neutralized.

Specific example of alkyl ether sulfates of the present invention are sodium coconut alkyl ethylene glycol ether sulfate; sodium tallow alkyl triethylene glycol ether sulfate; and sodium tallow alkyl hexaoxyethylene sulfate.

Other preferred detergents utilizable herein are olefin sulfonates having about 12 to about 24 carbon atoms. The term "olefin sulfonates" is used herein to mean compounds which can be produced by the sulfonation of α-olefins by means of uncomplexed sulfur trioxide, followed by neutralization of the acid reaction mixture in conditions such that any sultones which have been formed in the reaction are hydrolyzed to give the corresponding hydroxy-alkane-sulfonates. The sulfur trioxide can be liquid or gaseous, and is usually, but not necessarily, diluted by inert diluents, for example, by liquid $SO_2$, chlorinated hydrocarbons, etc., when used in the liquid form, or by air, nitrogen, gaseous $SO_2$, etc., when used in the gaseous form.

The α-olefins from which the olefin sulfonates are derived are mono-olefins having 12 to 24 carbon atoms, preferably 14 to 16 carbon atoms. Preferably, they are straight chain olefins. Examples of suitable 1-olefins include 1-dodecene; 1-tetradecene; 1-hexadecene; 1-octadecene; 1-eicosene and 1-tetracosene.

In addition to true alkene sulfonates and a portion of hydroxy-alkanesulfonates, olefin sulfonates can contain minor amounts of other materials, such as alkene disulfonates depending upon the reaction conditions, proportion of reactants, the nature of the starting olefins and impurities in the olefin stock and side reactions during the sulfonation process.

Specific α-olefin sulfonates for use in the present invention are described more fully in U.S. Pat. No. 3,332,880 of Phillip F. Pflaumer and Adriaan Kessler, issued July 25, 1967, titled "Detergent Composition," the disclosure of which is incorporated herein by reference.

It can also be desirable to add to the compositions of the detergent embodiment of the present invention a detergent builder component. These detergent builders are used at concentrations of from about 0 to about 60%, preferably 20 to 50% of the detergent composition. They can be represented by all detergent builder ingredients which are known to be suitable for use in detergent compositions. As regards their function, they serve to maintain the pH of the laundry solution in the range of from about 7 to about 12, preferably from about 8 to about 11. In addition, they enhance fabric cleaning performance in combination with the detergent surface-active ingredient. Other well-known functions of detergent builder salts relate to their capability for suspending particulate salts released from the surface of the fabric and also preventing redeposition on the fabric.

Suitable detergent builder salts useful herein can be of the poly-valent inorganic and poly-valent organic types, or mixtures thereof. Non-limiting examples of suitable water-soluble, inorganic alkaline detergent builder salts include the alkali metal carbonates, borates, phosphates, polyphosphates, tripolyphosphates, bicarbonates, silicates and sulfates. Specific examples of such salts include the sodium and potassium tetraborates, perborates, bicarbonates, carbonates, tripolyphosphates, orthophosphates and hexametaphosphates.

Examples of suitable organic alkaline detergency builder salts are (1) water-soluble amino polyacetates, e.g., sodium and potassium ethylenediamine tetraacetates, nitrilotriacetates and N-(2-hydroxyethyl)nitrilodiacetates; (2) water-soluble salts of phytic acid, e.g., sodium and potassium phytates; (3) water-soluble polyphosphonates, including, sodium, potassium and lithium salts of ethane-1-hydroxy-1,1-diphosphonic acid; sodium, potassium and lithium salts of methylenediphosphonic acid and the like.

Additional organic builder salts useful herein include the polycarboxylate materials described in U.S. Pat. No. 2,264,103, including the water-soluble alkali metal salts of mellitic acid. The water-soluble salts of polycarboxylate polymers and copolymers such as are described in U.S. Pat. No. 3,308,067, incorporated herein by reference, are also suitable herein. It is to be understood that while the alkali metal salts of the foregoing inorganic and organic poly-valent anionic builder salts are preferred for use herein from an economic standpoint, the ammonium, alkanolammonium, e.g., triethanolammonium, diethanolammonium, and the like, water-soluble salts of any of the foregoing builder anions are useful herein.

Mixtures of organic and/or inorganic builders can be used herein. One such mixture of builders is disclosed in Canadian Pat. No. 755,038, e.g., a ternary mixture of sodium tripolyphosphate, trisodium nitrilotriacetate and trisodium ethane-1-hydroxy-1,1-diphosphonate.

While any of the foregoing alkaline poly-valent builder materials are useful herein, sodium tripolyphosphate, sodium nitrilotriacetate, sodium mellitate, sodium citrate and sodium carbonate are preferred herein for this builder use.

In addition to the ingredients described hereinbefore, the detergent formulations of this invention can also contain other optional detergent composition ingredients which make the product more effective and more attractive.

So, for example, organic and inorganic peroxy bleach compounds can be incorporated in these compositions in an amount from about 5 to about 40%.

The peroxy bleach compound can be represented by all usual inorganic and organic ingredients which are known to be satisfactory for being incorporated for that purpose in detergent compositions. Examples of inorganic peroxy bleach compounds are the alkaline metal salts of perborates, percarbonates, persilicates, persulfates, and perphosphates. As is well known, the perborates can have different degrees of hydration. Although frequently the tetrahydrate form is used, it is for certain purposes desirable to incorporate the perborates having a lower degree of hydration water, for example, one mole, two moles, or three moles. Organic peroxy bleach agents may be used as well. The like ingredients can be incorporated as such, i.e., they have been prepared previously or they may be prepared in situ through the addition of, for example, any peroxy bleach agents suitable for being used in combination with an organic peroxy-bleach activator.

Specific examples of the organic peroxy-bleach compounds are the water-soluble salts of mono- and diperoxy acids such as perazelaic acid, monoperoxyphthalic acid, diperoxy-terephthalic acid, 4-chlorodiperoxyphthalic acid. Preferred aromatic peracids include the water-soluble salts of diperisophthalic acid, m-chloroperbenzoic acid and p-nitroperbenzoic acid.

In the event the peroxy bleach compound is to be prepared in situ, then its precursors, i.e., the peroxy bleach agent and peroxygen activators are to be added separately to the detergent composition. The peroxygen bleach can be represented by all oxygen bleaching agents which are commonly used in detergent technology, i.e., organic and inorganic species, as mentioned hereinbefore. The activating agents can be represented by all the oxygen activators known as being suitable for use in detergent technology. Specific examples of the preferred activators include acylated glycolurils, tetra-acetyl methylene diamine, tetra-acetyl ethylene diamine, triacetyl isocyanurate and benzoylimidazole. Acid anhydride activators which bear at least one double bond between carbon atoms in $\alpha,\alpha'$ to the carbonyl group of the anhydride radical can be used as well. Examples thereof are phthalic and maleic anhydrides. Especially preferred bleach activators are based on aldehydes, ketones, and bisulfite adducts of aldehydes and ketones. Examples of these especially preferred activators include: 1,4-cyclohexanedione; cyclohexanone; 3-oxo-cyclohexylacetic acid; 4-tertbutylcyclohexanone; 5-diethylmethylammonio-2-pentanone nitrate; N-methyl-morpholinioacetophenone nitrate; acetone, methyl ethyl ketone; 3-pentanone; methylpyruvate; N-methyl-4-oxo-piperidine oxide; 1,4-bis(N-methyl-4-oxo-piperidiniomethyl) benzene chloride; N-methyltropinonium nitrate; 1-methyl-4-oxo-tetrahydrothiapyranonium nitrate; N-benzyl-N-methyl-4-oxo-piperidinium nitrate; N,N-dimethyl-4-oxo-piperidinium nitrate; di-2-pyridyl ketone, and chloral hydrate.

In the event the peracid is prepared in situ, then the molar ratio of peroxygen bleach agent to bleach activator shall preferably be in the range from about 5:1 to 1:2, especially from 2:1 to 1:1.2.

Other detergent composition ingredients used herein include suds regulating agents such as suds boosters and suds suppressing agents, tarnish inhibitors, soil suspending agents, buffering agents, brighteners, fluorescers, perfumes, dyes and mixture. The suds boosters can, e.g., be represented by diethanolamides. Silicones, hydrogenated fatty acid, and hydrophobic alkylene oxide condensates can be used in the like compositions for suds suppressing purposes or, more generally, for suds regulating purposes. Benzotriazole and ethylenethiourea can be used as tarnish inhibitors. Carboxymethyl cellulose is a well-known soil suspending agent. The above additional ingredients, when used in the instant compositions, shall be employed in the usual ranges.

The detergent compositions of the instant invention can be of any physical state, i.e., liquid, pasty, powdered and granular. Highly preferred are solid, including powdered and granular, detergent compositions.

The following examples are illustrative but do not limit the present invention.

The aminated celluloses (AP1 and 2) having a nitrogen content of 0.020 and 0.17%, respectively, prepared as described above have been used for the stabilization and activity enhancement of enzymatic ingredients.

Saturated aqueous solutions (containing less than 1%) of $AP_1$ or $AP_2$ were tested for their ability to stabilize and enhance the activity of horseradish peroxidase and protease (ALCALASE). Variations in enzymatic activity were measured by a standard method with the following results.

| | | | RELATIVE ENZYMATIC ACTIVITY AT 100°F | | | | |
|---|---|---|---|---|---|---|---|
| EXAMPLE | ADDITIVE | ENZYME | t=O | 1 WEEK | 2 WEEKS | 4 WEEKS | 6 WEEKS |
| | None | Peroxidase (EC 1.1.11.17) | 1 | 0.70 | 0.64 | 0.60 | |
| I | AP1 | Peroxidase (EC 1.1.11.17) | 2.40 | 1.84 | 1.74 | — | |
| II | AP2 | Peroxidase (EC 1.1.11.17) | 2.47 | 1.85 | 1.71 | — | |
| III | Cationic Potato Starch* (Saturated Solution; <1%) | Peroxidase (EC 1.1.11.17) | 1.28 | — | 1.18 | 1.26 | |
| IV | JR-IL** 1% | Peroxidase (EC 1.1.11.17) | 1.07 | .97 | .81 | .75 | |
| | | | RELATIVE ESTERASE ACTIVITY AT 100°F | | | | |
| | None | Alcalase (EC 3.4.4.16) | 1 | | | | .13 |
| V | AP2 (0.5%) | Alcalase (EC 3.4.4.16) | 1.46 | | | | .41 |
| | | | RELATIVE PROTEASE ACTIVITY | | | | |
| | None | Alcalase (EC 3.4.4.16) | 1 | | | | |
| VI | AP2 (0.5%) | Alcalase (EC 3.4.4.16) | 3.3 | | | | |

*Cato - Supplied by National Starch & Chemical Corporation
**Cationic Cellulose - Supplied by Union Carbide Corporation Peroxidase experiments done in phosphate buffer between pH 6.0 – 7.0
Alcalase experiments done in phosphate trishydroxymethylamine methane HCl at pH 7.8

The above examples clearly show that a significant stabilization and enhancement of enzymatic activity in an aqueous solution occurs from the use of said enzymes in conjunction with the aminated polysaccharides as defined hereinbefore.

Substantially identical enhancement results are also obtained in the event peroxidase is replaced by an equivalent quantity of EC 1.1.1.1 — alcohol dehydrogenase; EC 1.1.1.6 — glycerol dehydrogenase; 1.1.1.27 — lactate dehydrogenase; 1.1.1.37 — malate dehydrogenase; 1.1.3.4 — glucose oxidase; 1.10.3.2 — laccase; 1.10.3.3 — ascorbate oxidase; 1.11.1.3 — fatty acid peroxidase; 1.11.1.6 — catalase; 1.13.1.13 — lipoxidase.

Substantially identical results are also obtained when ALCALASE is substituted with an equivalent amount of 3.1.1.3 — lipase; 3.1.1.13 — cholesterol esterase; 3.1.1.20 — tannase; 3.1.3.1 — alkaline phosphatase; 3.1.3.2 — acid phosphatase; 3.1.4.1 — phosphodiesterase; 3.2.1.1 — $\alpha$-amylase; 3.2.1.2 — $\beta$-amylase; 3.2.1.4 — cellulose; 3.2.1.11 — dextranase; 3.2.1.14 — chitinase; 3.2.1.17 — muramidase (lysozyme); 3.4.1.2 — aminopeptidase; 3.4.2.3 — yeast carboxypeptidase; 3.4.4c — bromelain; 3.4.4.1 — pepsin; 3.4.4.3 — rennin; 3.4.4.4 — trypsin; 3.4.4.5 — chymotrypsin; 3.4.4.10 — papain; 3.4.4.16 — subtilopeptidase A; 3.4.4.17 — aspergillopeptidase A.

Granular detergent compositions capable of providing superior cleaning performance to fabrics laundered therewith having the following formula are prepared.

| INGREDIENT | EXAMPLE VII (Parts) | EXAMPLE VIII (Parts) | EXAMPLE IX (Parts) | EXAMPLE X (Parts) |
|---|---|---|---|---|
| Lipase | | | | |
| Remyzyme PL-600 | 0.1 | — | — | — |
| Amano M-AP | — | 0.45 | — | — |
| Takedo 1969-4-9 | — | — | 0.2 | — |
| Meito MY-30 | — | — | — | 0.3 |
| Linear dodecylbenzene sulfonate sodium salt | 35 | — | — | 15 |
| Sodium tallow alkyl triethylene glycol ether sulfate | — | 28 | — | 10 |
| Sodium salt of sulfonated 1-hexadecene | — | — | 20 | — |
| Sodium perborate tetrahydrate | — | — | 10 | 20 |
| Sodium tripolyphosphate | 25 | 15 | 30 | 20 |
| Sodium salt of oxydisuccinic acid | 25 | 30 | 20 | 20 |
| Stabilizing agent | | | | |
| AP1 | 1.0 | — | 7.0 | — |
| AP2 | — | 2.5 | — | 4.0 |
| Miscellaneous including sodium sulfate, moisture and minor ingredients | Balance to 100 | | | |

| INGREDIENT | EXAMPLE XI (Parts) | EXAMPLE XII (Parts) | EXAMPLE XIII (Parts) | EXAMPLE XIV (Parts) |
|---|---|---|---|---|
| Amylase | | | | |
| Novo bacterial α -amylase | 0.2 | — | — | — |
| Monsanto DA-10 | — | 0.4 | — | — |
| Protease | | | | |
| Maxtase | — | — | 0.75 | — |
| Rapidase | — | — | — | 1.0 |
| Linear dodecyl benzene sulfonate-sodium salt | 28 | — | — | 20 |
| Sodium coconut alkyl trioxyethylene sulfate | — | 20 | — | 10 |
| Sodium salt of sulfonated $C_{14-16}$ 1-olefin | — | — | 20 | — |
| Sodium perborate tetrahydrate | 25 | 35 | 30 | 18 |
| Sodium tripolyphosphate | 30 | — | 25 | 10 |
| Sodium oxydisuccinate | 10 | 30 | — | 20 |
| Stabilizing Agent | | | | |
| AP1 | 1.5 | — | 2.0 | — |
| AP2 | — | 4.0 | — | 3.0 |
| Miscellaneous | Balance to 100 | | | |

The compositions of examples XI—XIV provide, when used in a conventional laundering operation, improved cleaning performance relative to the cleaning performance obtainable from identical compositions which do not contain the aminated polysaccharides AP1 and AP2.

Substantially identical results are also obtained when the aminated polysaccharides of examples XI-XIV are substituted with an equivalent amount of ASTRO X-100; Cato; Electra; Q-Tac; Sta-Lok; or Supercharg.

Substantially identical results are also obtained when the aminated polysaccharides of examples XI-XIV are replaced by an equivalent amount of the reaction product of starch or cellulose with an aminating agent of the formula

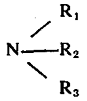

wherein $R_1$ represents hydrogen or an alkyl group having from 1 to 4 carbon atoms, $R_2$ represents hydrogen or an alkyl group having from 1 to 4 carbon atoms and $R_3$ represents hydrogen or an alkyl group having from 1 to about 12 carbon atoms.

What is claimed is:

1. An enzyme composition having improved activity and stability in aqueous solution comprising:

a. an enzyme; and b. an aminated polysaccharide selected from cellulose, hydroxyethylcellulose, methyl cellulose or starch having from about 0.01% to about 2% by weight of nitrogen in its elemental composition, wherein the weight ratio of said aminated polysaccharide to said enzyme is in the range from about 500:1 to 1:1.

2. A composition in accordance with claim 1 wherein the weight ratio of said enzyme to said aminated polysaccharide is in the range from about 1:100 to about 1:2.

3. A composition in accordance with claim 2 wherein the aminated polysaccharide is selected from the group consisting of aminated starch and aminated cellulose.

4. A composition in accordance with claim 3 wherein the enzyme is selected from EC classes 1 and 3.

5. A composition in accordance with claim 1 wherein the aminated polysaccharide is a reaction product of:

a. an amine selected from the group consisting of trimethylamine; dimethylbutylamide; dimethylhexylamine; dimethyl dodecylamine; methyldiethylamine; methylethylbutylamine; diethylamine; dipropylamine; dibutylamine; ethyldecylamine; or methylnonylamine; with b. a compound selected from the group consisting of glycerol α,γ-dichlorohydrin and epichlorohydrin;

and c. a polysaccharide selected from cellulose, hydroxyethylcellulose, methyl cellulose or starch.

6. A composition in accordance with claim 5 wherein the enzyme is selected from the group consisting of peroxidase-EC 1.11.1.7 and subtilopeptidase A EC 3.4.4.16.

* * * * *